United States Patent [19]

Bérenger

[11] Patent Number: 4,495,012

[45] Date of Patent: Jan. 22, 1985

[54] METHOD OF AND APPARATUS FOR PRODUCING DECORATIVE FLOOR AND WALL COVERINGS

[75] Inventor: Daniel Bérenger, Saint Paul Trois Chateaux, France

[73] Assignee: Gerland S.A., Villeurbanne, France

[21] Appl. No.: 505,310

[22] Filed: Jun. 17, 1983

[30] Foreign Application Priority Data

Jun. 18, 1982 [FR] France ............................... 82 11122

[51] Int. Cl.$^3$ ........................ B32B 37/02; B44C 1/16; C09J 5/02; B44C 3/00

[52] U.S. Cl. ...................................... 156/78; 156/238; 156/240; 156/241; 156/308.6

[58] Field of Search ............... 156/230, 240, 238, 241, 156/249, 289, 298, 308.6, 315, 324, 333, 78, 79, 236, 246; 428/200, 914, 158; 427/207.1, 413; 101/34, 452

[56] References Cited

U.S. PATENT DOCUMENTS

| | | | |
|---|---|---|---|
| 3,901,990 | 8/1975 | Solomon | 156/241 |
| 4,225,374 | 9/1980 | Kaufman | 156/240 |
| 4,278,713 | 7/1981 | Burba et al. | 156/333 |
| 4,335,495 | 6/1982 | Buchanan | 156/240 |
| 4,401,720 | 8/1983 | Davis | 156/333 |
| 4,405,393 | 9/1983 | Tillotson | 156/238 |

FOREIGN PATENT DOCUMENTS

| | | | |
|---|---|---|---|
| 2045688 | 11/1980 | United Kingdom | 156/79 |

*Primary Examiner*—Edward Kimlin
*Assistant Examiner*—Louis Falasco
*Attorney, Agent, or Firm*—Karl F. Ross

[57] ABSTRACT

Floor and wall coverings having a pattern are made by coating a plastisol onto a sheet support, and simultaneously with a thermal activation of the plastisol to gelify it, bringing a transferable pattern on a paper layer into contact with the plastisol.

8 Claims, 1 Drawing Figure

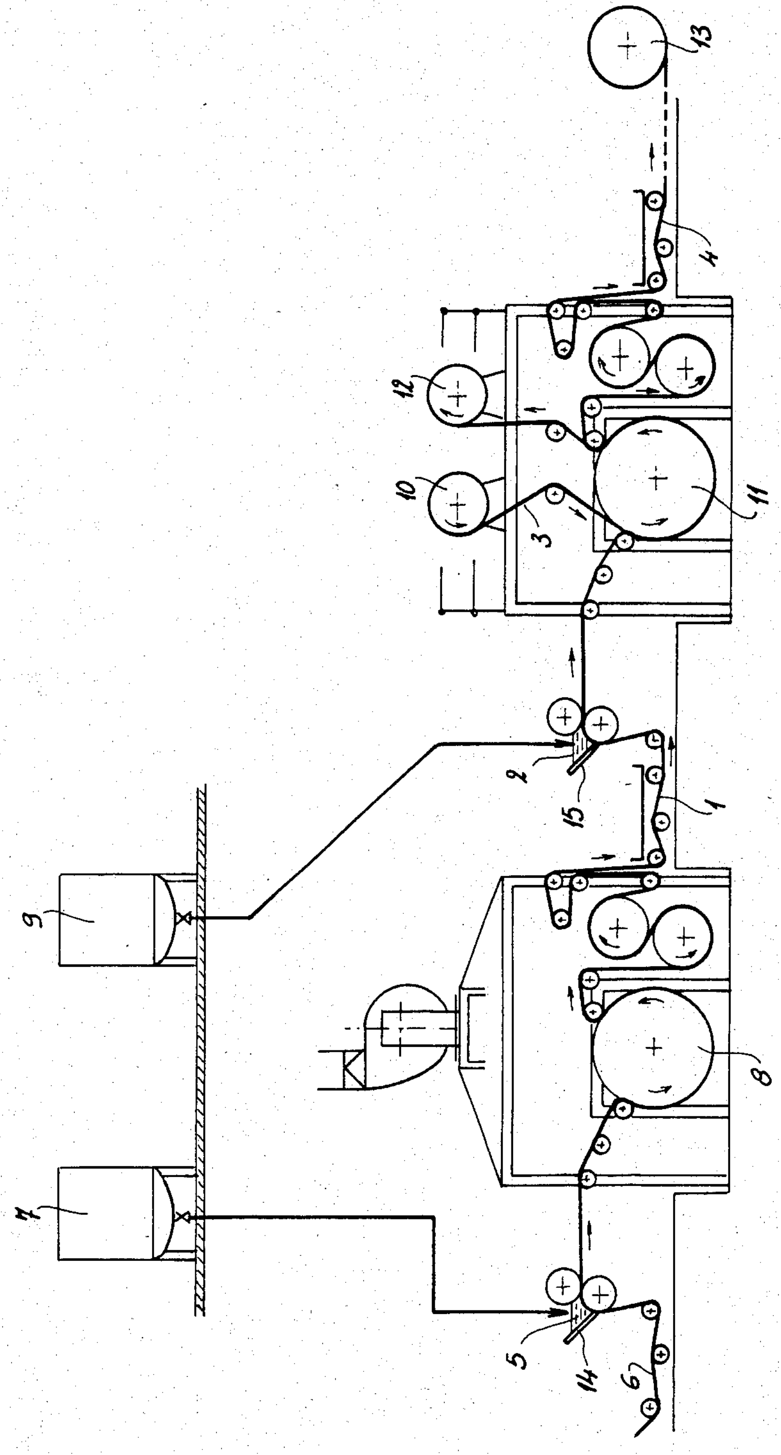
13
4
12
10
3
11
2
15
1
9
8
7
5
14
6

METHOD OF AND APPARATUS FOR PRODUCING DECORATIVE FLOOR AND WALL COVERINGS

FIELD OF THE INVENTION

The present invention relates to a continuous process for producing floor and wall coverings and, more particularly, decorative floor and wall coverings of synthetic resin materials and especially polyvinylchloride (PVC). The invention also relates to an apparatus for carrying out this process, i.e. an apparatus for producing PVC floor and wall coverings with a decorative pattern.

BACKGROUND OF THE INVENTION

Polyvinylchloride foils, which can comprise reinforcements in the form of a mat of glass fibers, a screen or grid of other material, reinforcement fibers of various types, etc., can be provided with pattern-forming impressions or prints during fabrication by a costing process. The foils or sheets can be made by classical methods whereby the vinylic liquid composition of polyvinylchloride base, together with plasticizers and various other additives, is formed into a sheet configuration and solidified at an elevated temperature, generally about 150° to 180° C. in order to effect a gelification or gelling of the material. This gelification can be effected in an oven or carried out by contact of the liquid sheet with a highly polished heated cylinder or drum at the desired temperature. The gelification is carried out contemporaneously with the formation of a surface to which a pattern can be applied by embossment or printing.

The gelification cylinders or drums are utilized in the industrial production of polyvinylchloride floor and wall coverings and for the production of sheets of vinylic materials of different compositions.

Most of the polyvinylchloride based plastic products in sheet form, namely, sheet, awning, curtains, canopies, floor coverings, wall coverings etc. are provided with a decor formed by printing the foil in a plurality of colors.

Such prints can be made by various techniques, e.g. heliography, offset, silk screening using a flat or rotary screen, flexography, . . . , all of which are utilized generally after gelification of the plastic support substrate to be decorated.

The direct printing of a plastic support which is not gelified or which has not been gelified and which will be gelified subsequently, has a number of disadvantages, not the least of which is the dimensional instability of the support which leads to distortion or deformation of the pattern which is applied by printing when gelification is effected.

Naturally it is theoretically possible to integrate in the gelification device a unit for printing the plastic support so as to produce decorative coverings in a continuous manner. However, this has not been found to be practical for a variety of reasons, including the high investment cost which the combination of a printing machine with a gelification machine must involve. The costs include the expenses in preparing the matrices or printing drums or rollers necessary to apply each color to the support to be decorated. For example, if a five color pattern is to be applied to the polyvinylchloride support, five printing drums or matrices are required with respective inking or color application units.

The integration of a printing unit with the gelification unit is thus not justifiable on economic grounds and also poses problems which may interfere with the production of the plastic foil.

Furthermore, if printer systems are provided in separate lines for the plastic sheet material, the cost of handling and producing decorative sheet material with such systems is increased as well.

Moreover, when the patterning system is not integrated with the production of the foil, it is necessary to roll up the foil before printing and to unroll the foil for the printing operation, both being time consuming handling operations.

It has been proposed heretofore to apply patterns to such foils by transfer processes utilizing decalcomania, i.e. patterns which are carried by a paper sheet from which the pattern is transferred to the plastic foil.

The paper utilized in this case is treated, before printing, with special compositions which enable the ink normally used for printing on polyvinylchloride, generally inks or dyestuffs which are polyvinylchloride and polyvinylacetate copolymers, such that these inks or dyestuffs adhere only feebly to the paper and can be transferred hot to the plastic support to be decorated.

In other words, the decalcomania carrier or substrate is pretreated with an agent which promotes release of patterns printed on the paper support onto the synthetic resin foil.

This transfer operation is generally carried out at a temperature between 100° C. and 180° C. and under slight pressure.

The printed face of the paper and the face of the plastic support to be decorated are maintained in contact over a short period sufficient to enable the transfer of the pattern from the paper to the plastic support to take place.

This operation requires equipment capable of bringing about intimate contact at the desired temperature between the pattern carrying paper and the preformed plastic support to be patterned and the machines which have been proposed for this purpose are so called doubling or lining machines of the type developed for the plastics and rubber industries of which I can mention the Auma, Rotodorn, Rotocure types and like machines. The speed of transfer generally is relatively high and can be between 20 and 50 meters per minute. In other words, the linear speed of the two sheets during contact to transfer the pattern is between 20 and 50 meters per minute.

After a slight cooling to about 50 to 80 degrees heat, for example, the paper is separated from the plastic support leaving the transferred pattern intact upon the latter.

This system has the advantage that it allows transfer of a multicolor pattern in one step to the plastic support, but the disadvantage that in the past it has not been effectively integrated with the production of the plastic support.

OBJECTS OF THE INVENTION

It is, therefore, the principal object of the present invention to provide a substantially continuous process for producing decorative plastic floor and wall coverings and other plastic sheet materials whereby the disadvantages of the earlier systems can be obviated.

Another object of the invention is to provide an integrated process in which plastic sheet material is produced and is decorated or patterned, whereby the equipment required is comparatively inexpensive and hence the investment cost for carrying out the process is minimal.

Another object of this invention is to provide an improved apparatus for producing and patterning synthetic resin sheet materials and, more specifically, polyvinylchloride sheet materials.

SUMMARY OF THE INVENTION

These objects and others which will become apparent hereinafter are attained, in accordance with the invention in a method of making a floor or wall covering in the form of a patterned sheet of a plastic material in which a reinforcement is covered or coated with a plastisol layer and the coated product, prior to gelification, is contacted with the pattern-carrying face of a paper sheet provided with a transferable pattern, the sheet and the plastisol coated reinforcement being then subjected simultaneously to the action of heat and pressure such that, in a single operation, the gelification of the plastisol and the transfer of the pattern from the paper sheet to the gelifying plastisol surface is effected, thereby producing the plastic layer simultaneously with the transfer of the pattern to the latter.

The paper carrying the pattern according to the invention is advantageously provided, before the pattern is applied thereto, with a filmogenic layer of a product adapted to facilitate the transfer of the pattern to the gelifying plastisol as the plastic sheet is formed.

Products this typed include zein, a corn protein containing 17 amino acids and utilized in paper coating heretofore, carboxymethyl-cellulose, silicones and synthetic resins such as polyethylene, polypropylene and poylamide.

In general any thermally activatable release agent utilized for the transfer of thermal transferable decalcomanias can be utilized according to the invention.

In a preferred embodiment of the invention, the support serving to reinforce the plastic sheet is constituted by a layer of fibers such as glass fibers, preferably impregnated with a layer of plastisol and then gelified. This support thus has at least a surface which is perfectly planer and which can be coated with a second plastisol layer against which the patterned paper sheet is applied. This latter plastisol layer, of course, is simultaneously gelified and patterned with the transferred impression from the paper sheet. The reinforcement is free from irregularities when it meets the second plastisol layer and the latter is gelified. Naturally, if only one plastisol layer is applied to the reinforcement, it is brought into contact with a patterned surface of the paper sheet.

The apparatus utilized for carrying out the method of the invention can comprise a first station provided with a plastisol coating means for applying to the sheet of glass fibers a first plastisol layer, means for gelifying this first plastisol coating, means downstream fo the first gelifying means for applying a second plastisol layer to the reinforcement body thereby formed, means for bringing the patterned sheet into contact with this second plastisol layer and jointly presenting the plastisol-covered reinforcement and the paper sheet carrying the transferable layer to a gelification drum on which the plastisol layer is heated to the gelification temperature and the patterned sheet is held against the plastisol coated reinforcement with the requisite pressure for the necessary time for transfer and gelification of the second plastisol coating, means for separating the paper substrate from which the pattern has been stripped by transfer to the gelifying plastisol from the plastic sheet, and means for rolling up the patterned plastic sheet adapted to serve as the floor or wall covering.

Means may be provided for carrying out any finishing steps required on the patterned plastic sheet before the latter is wound up.

BRIEF DESCRIPTION OF THE DRAWING

The above and other objects, features and advantages of the present invention will become more readily apparent from the following description, reference being made to the accompanying drawing, the sole FIGURE of which is a diagrammatic side elevational view showing an apparatus for producing plastic floor and wall covering according to the instant invention.

SPECIFIC DESCRIPTION AND EXAMPLES

In the drawing, the support 1 is coated with a plastisol 2 which is then brought into contact with a pattern-carrying paper sheet 3 so that simultaneous gelification and pattern transfer are carried out on the drum 11.

The support 2 may be a glass fiber layer or may be a previously gelled plastisol layer in which a glass layer is provided. In that case, the support is formed from a glass layer 6 which is impregnated with the plastisol 5 and the first plastisol layer is gelified on the drum 8.

EXAMPLE I

Floor Covering With Expanded Pattern Layer
Preparation of support 1

Utilizing a doctoring coating device 14, a layer of glass fibers of a surface weight of 50 grams per meter$^2$, formed in a glass fiber mat producing unit not shown in the drawing, either as a non woven fiber mat or as a woven fiber mat, is coated with 400 grams per meter$^2$ of plastisol 5 supplied from a reservoir 7 and have the following composition:

Polyvinylchloride microsuspension, K-80, Type PB 1702 as marketed by the ORGAVYL corporation (France): 100 g
Di-iso-octylphthalate: 60 g
Barium-zinc stabilizing liquid: 2 g
Calcium carbonate (mean diameter 14 microns): 45 g
Titanium dioxide: 5 g
Wetting agent: 2 g The viscosity of the plastisol is adjusted to 2500 centipoises by the addition of 1 to 2% dodecylbenzene. Note that any thermoactivatable polyvinylchloride plastisol commonly used for floor coverings can be utilized here as well.

The coated glass layer is gelified on the cylinder 8 at a temperature of 150° to 155° C., the resulting support sheet being cooled. The support sheet 1 which thus results is coated with 300 grams per meter$^2$ of expandable plastisol 2 delivered from a reservoir 9 and having the following composition:

K-68 Polyvinylchloride microsuspension, type PB 1152 C as marketed by the ORGAVYL Corporation (France): 40 g
Polyvinylchloride emulsion, K-68, type P 68 E, marketed by the WACKER Corporation (Germany) 40 g
A polyvinylchloride blending resin suspension of the type PB 8015 marketed by the ORGAVYL Corporation (France) 20 g
Butylbenzyphthlate 20 g
Di-octylphthalate 35 g Calcium carbonate (mean particle size 14 microns) 10 g
Blowing agent (azodicarbonamide) 2.40 g
Catalyst stabilizer (zinc oxide) 1.20 g
titanium dioxide 3.60 g The viscosity of this plastisol is adjusted to 4000 centipoises with dodocylbenzene.

The coating is effected by doctoring as shown in the drawing or with the aid of a reverse roll coater.

The coated support is then brought into contact with the gelifying cylinder 11 at the same time as a transfer paper with a pattern previously applied to thereto is pressed by a roller against the outer face of the coated support. The transfer paper is drawn from a roll 10.

The transfer paper is a coated paper of a surface weight of 50 grams per meter$^2$ previously coated with a release agent in an amount of 20 grams per meter$^2$, the release agent being a resin such as polypropylene. The paper is then printed by heliography with a pattern utilizing an ink of the following composition:

Type VYNS polyvinylchloride polyvinylacetate copolymer as marketed by UNION CARBIDE: 17 g
Methylethylketone: 80 g
Methylisobutylketone: 20 g
Microlith K pigment as available from CIBA GEIGY 0-1-10 g The viscosity is adjusted with methylethylketone to produce the ink with a viscosity of 15 seconds (Ford cut number 4).

I was also able to use an ink containing an expansion inhibitor capable of producing relief patterns, i.e. trimellitic anhydride or benzotriazole in an amount of 2.5 to 10% depending upon the degree of relief desired in the pattern.

The gelifying cylinder 11 is maintained at a temperature between 130° and 190° C. and the peripheral speed of the drum and hence the speed of the paper layering contact with the gelifying layer is 20 meters per minute. At this speed, the temperature was preferably maintained at 170° C. The contact is maintained over the greater part of the circumference of the drum. On leaving the drum the paper layer from which the pattern has been transferred is wound up on a roll and the plastic sheet is cooled. The paper on the roll 12 can be reimprinted with a patter to be transferred for subsequent operations.

The polyvinylchloride sheet product which results is thus provided with the transferred pattern on the expanded plastisol surface.

Especially when the ink contains an expansion inhibitor to provide a relief pattern on the synthetic resin sheet, I may make use of a reverse roll unit, now shown in the drawing, which is disposed between the cooling stretch following the drum 11 and the roll 13 on which the finished product is coiled. This can be used to apply 320 grams per meter$^2$ of a transparent surfacing layer having the following composition:

A microsuspension of a value K-50 type PB 1702 of polyvinylchloride as marketed by ORGAVYL: 40 g
Emulsion value K-80, type P-80 polyvinylchloride as marketed by WACKER: 40 g
Suspension with a value K-65, type C 65 V polyvinylchloride as marketed by WACKER: 20 g
Butylbenzylphthalate: 26 g
Di-octylphthalate: 70 g
Texanolisobutyrate: 7 g
Expoxydized soy oil: 4 g
Barium-zinc stabilizing liquid: 3 g
Ultraviolet absorber: 0.2 g
Deaeration Additive: 0.2 g
Dodecylbenzene: 5 g The support for thus coated is then past through an oven heated to 200° to 210° C. and at this temperature the blowing agent decomposes to yield a chemical sponge except in those regions coated with the inhibitor or provided with the ink containing the inhibitor.

The surface is gelified.

The patterned a released floor coring thus produced can be coated with a mechanical sponge or foam having the following composition:

Emulsion, value K-70 polyvinylchloride, type EF 701 marketed by PLASTIMER (France) 100 g
Butylbenzylphthalate 25 g
Di-oxtylphthalate 25 g
Barium-zinc stabilizing liquid 2 g
Calcium carbonate (mean particle size 14 microns) 20 g
Silicone surfactant 3 g This plastisol is foamed mechanically by incorporating dry air therein in a mechanical beater of the Monodomix type.

300 grams per meter$^2$ of the mechanical foam thus obtained with a density of 500 grams per liter, is applied to the floor covering. It is gelified in an oven at 175° C. The gelified and decorative floor covering is then coiled up at 13.

EXAMPLE II

Preparation of an Expanded Patterned Relief Wall Covering

A glass fiber sheet 1 of a surface weight of 50 grams per meter$^2$ is coated directly at 15 with a composition 2 comprising:

Polyvinylchloride microsuspension value K-68: 50 g
Polyvinylchloride emulsion value K-68: 50 g
Butylbenzylphthalate: 25 g
Di-octylphthalate: 35 g
Calcium carbonate powder as previously described: 40 g
Blowing agent (azodicarbonamide): 2.40 g
Zinc oxide catalyst: 1.20 g
Titanium dioxide and pigments: 7 g
Barium-zinc stabilizing liquid: 2 g
Epoxidized soy oil: 5 g The viscocity of this plastisol is adjusted with white spirit to 5000 centipoises. It is coated at a rate of 400 grams per meter$^2$ onto the glass fiber sheet.

The transfer paper 3, namely, a paper of 500 grams per meter$^2$ coated with a polyamide film of 20 grams per meter$^2$, is prepared so that it transfers a pattern to the plastisol and at the same time applies a finishing coating to the latter.

The finishing coating, previously applied to the paper, thus can be acrylic varnish of the following composition:

Acrylic resin (ELVACITE 2041) marketed by DUPONT de NEMOURS (USA): 20 g
Methylethylketone: 100 g 10% by weight of micronized amorphous silica of the type marketed by the firm GRACE under the name SILOID, can be added to this composition to provide a matte finish for the varnish.

The paper is also printed with the pattern utilizing an ink of the following composition:

Acrylic resin ELVACITE 2041 17 g

Methylethylketone 80 g

Methylisobutylketone 20 g

Acrylic pigments of the ROWALID type PP. AC. as marketed by the firm ROWA (Germany) 0.1–10 g An expansion inhibitor can be added to this ink and if added is trimellitic anhydride in an amount of 5% for a slight relief pattern and in an amount of about 10% by weight for a more marked relief pattern.

The pattern and the varnish are transferred simultaneously with gelification of the plastisol by contacting the pattern side of the paper with the plastisol coated fiber sheet as it reaches the gelifying cylinder 11.

The transfer paper is then removed and the pattern and varnish carrying plastisol surface is passed through an oven held at a temperature of 200°–220° C. and not shown in the drawing.

The wall covering thus obtained has a pattern in relief which is coated with a surfacing varnish and can be rolled up at 13.

EXAMPLE III

Nonexpanded Floor or Wall Covering

Preparation of the support 1.

A glass fiber sheet 6 of 50 grams per meter$^2$ is coated by doctoring at 14 with 300 grams per meter$^2$ of the plastisol 5 of the following composition:

Emulsion type polyvinylchloride, value K-80, type E 80 CA, marketed by WACKER: 100 g Di-octylphthalate: 60 g Chlorinated paraffin: 25 g Barium-cadium-zinc stabilizing liquid: 150 g Titanium dioxide and pigments: 3.5 g Wetting agent additive: 1.5 g Viscosity reducer: 2–4 g The viscosity is adjusted to 3500 centipoises. After gelification of this plastisol on the heated drum 8 at 140°–145° C., a second plastisol 2 is applied at a rate of 350 grams per meter$^2$ utilizing the coating device 15 on the support 1. This second plastisol has the following composition:

Emulsion type polyvinylchloride, value K-70: 40 g

Emulsion type polyvinylchloride, value K-80: 40 g

Suspension type polyvinylchloride, value K-57: 20 g

Calcium carbonate: 40 g

Di-octylphthalate: 40 g

Barium-zinc stabilizing liquid: 2 g

Titanium dioxide and pigments: 5 g

The support 1 coated with a plastisol 2 is simultaneously pressed against the transfer paper and the cylinder 11 which is at a temperature of 180° C. The paper from which the pattern has been stripped is rolled up at 12 and to the patterned surface a transparent plastisol coating is applied at a rate of 100 grams per meter$^2$ for a floor covering.

This transparent plastisol composition consists of:

Microsuspension of polyvinylchloride, value K-70, type PB 1302 as marketed by ORGAVYL: 50 g Polyvinylchloride emulsion, value K-70 type P 70, marketed by WACKER: 50 g Santicizer 213 as marketed by MONSANTO (Belgium): 40 g Barium-zinc stabilizing liquid: 3 g Octylepoxystearate: 4 g Ultraviolet absorber: 0.2 g Dodecylbenzene: 2 g The plastisol coating is de-aerated in vacuo and is applied by the reversal roll technique and is gelified in an oven at 210° C.

The surface is textured by mechanical stamping before the covering is rolled up at 13.

I claim:

1. A process for continuously producing a floor or wall covering which comprises the steps of:

continuously applying a thermally activatable plastisole to a sheet support to form a plastisole-coated sheet;

continuously compacting the plastisol coated sheet with a transferrable pattern on a transfer paper continuously; and continuously and progressively thermally activating said plastisol to gelify the same while said pattern of said paper is in contact therewith, thereby transferring said pattern from said paper to the plastisol as it is gelified and forming a patterned gelified synthetic resin surface of a wall covering formed from said sheet.

2. The method defined in claim 1 wherein the plastisol applied to said support is an expandable plastisol, further comprising expanding the plastisol while it is in contact with said pattern.

3. The method defined in claim 1 which comprises the steps of coating said paper with a filmogenic layer prior to applying said pattern thereto to facilitate transfer of said pattern to said sheet.

4. The method defined in claim 3 wherein said filmogenic material is selected from the group which consists of polyethylene, polypropylene and polyamide resins.

5. The method defined in claim 3 wherein said filmogenic material is a silicone.

6. The method defined in claim 3 wherein said filmogenic material is selected from the group which consists of zein and carboxymethylcellulose.

7. The method defined in claim 1 wherein said support is formed by impregnating a layer of fibers with a plastisol and gelifying the plastisol impregnating the layer of fibers.

8. The method defined in claim 7 wherein said fibers are glass fibers.

* * * * *